Patented Apr. 24, 1934

1,956,030

UNITED STATES PATENT OFFICE 1,956,030

PRODUCTION OF COLORING MATTERS CONTAINING NITROGEN

Heinrich Hopff and Robert Schweizer, Ludwigshafen-on-the-Rhine, Germany, assignors to General Aniline Works, Inc., New York, N. Y., a corporation of Delaware No Drawing. Application August 5, 1932, Serial No. 627,674. In Germany August 14, 1931

20 Claims. (Cl. 260—60)

The present invention relates to new coloring matters containing nitrogen and a process for their production.

We have found that valuable coloring matters containing nitrogen are obtained by treating aromatic compounds containing at least one amino group fixed directly to the aromatic nucleus, in an aqueous medium with gases comprising oxygen under increased pressure and at elevated temperatures. The reaction may be carried out with oxygen from any source or with gas mixtures containing the same, for example with air. The treatment with gases comprising oxygen may take place in acid, neutral or alkaline aqueous media, but generally speaking the employment of an acid aqueous medium is advantageous. In many cases it is preferable to add oxygen-transferring compounds, as for example the salts of manganese, vanadium, copper, cobalt or lead, either with an inorganic acid, such as hydrogen chloride, or with an organic acid, as for example naphthenic acid. The oxygen-transferring compounds may be added in amounts of up to 5 per cent or even more; generally, however, it is sufficient to use quantities of from about 0.1 to 1 per cent.

Suitable amino compounds are for example the following ones: aniline and its homologues, N-alkylated anilines, such as mono- and di-methyl-aniline, mono- and di-ethylaniline, phenylenediamines, benzidine, alpha- and beta-naphtylamine, naphthylenediamines, such as 1.8-naphthylene-diamine, nitranilines, chloranilines, aminoazobenzene, o-, m- and p-methoxyaniline, aminoanthraquinones, such as 1.4-, 1.5-, and 1.8-diaminoanthraquinone, aminodibenzanthrone which may be prepared by nitrating dibenzanthrone and reducing the nitrodibenzanthrone thus obtained, anthranilic acid, phenylenediamine sulphonic acids, naphthylamine sulphonic acids, benzidine sulphonic acids and amino-anthraquinone sulphonic acids, such as 2-aminoanthraquinone-3-sulphonic acid.

The aromatic compounds containing at least one amino group fixed directly to the aromatic nucleus may be employed as such or in a form in which the amino group is combined with an acid capable of forming a salt with the said amino group; the said acid may be an inorganic acid such as hydrochloric acid or sulphuric acid or an organic acid, such as formic acid or acetic acid. According to the solubility of the aromatic compound containing at least one amino group fixed directly to the aromatic nucleus employed, in the aqueous medium used, under the working conditions, the said aromatic compound is either dissolved or suspended or emulsified in the aqueous medium. The reaction is carried out at elevated temperatures which in no case can be above the critical temperature of water and which is usually not below 100° C. It is preferable to work at temperatures between 120° and 250° C. The pressure is selected above 2 atmospheres the upper limit being given only by the resistance to pressure of the apparatus employed. In most cases it is advantageous to work under pressures corresponding to an initial pressure (measured at ordinary room temperature) of between 10 and 30 atmospheres. If diluted oxygen, for example air, is employed, usually higher pressures are suitable than in cases when oxygen without the addition of substantial amounts of other gases is used. Usually the reaction is finished after some hours, for example after 3, 5 or 8 hours which may be seen from the fact that the pressure does no longer change; it is advantageous, however, to continue heating still for some time longer. Mechanical movement, for example stirring, of the reacting mass is favorable, especially when the initial material is not dissolved in the aqueous medium. When employing aromatic compounds containing at least one amino group fixed directly to the aromatic nucleus and which are water-soluble as such (which expression excludes aromatic compounds containing at least one amino group fixed directly to the aromatic nucleus which become water-soluble by combining an acid with their amino group to form a salt, such as aniline hydrochloride) usually soluble final products are obtained; water-soluble initial materials coming into question are aromatic compounds containing besides the amino group sulphonic groups or other groups which render them water-soluble, as for example carboxyl groups. Soluble final products arise also when carboxyl groups are formed during the reaction as is the case when starting from methyl derivatives of anthraquinone or benzanthrone wherein the methyl group is oxidized to a carboxyl group; aromatic compounds containing no groups which render them water-soluble, however, usually yield reaction products which are insoluble in water.

The reaction products obtained may be employed as coloring matters. In so far as they are insoluble, they may be used as pigment dyestuffs and, in so far as they are soluble in water, as acid wool dyestuffs. In cases when they contain vattable groups they may be employed as vat dyestuffs.

The following examples will further illustrate the nature of this invention but the invention is not restricted to these examples. The parts are by weight.

Example 1

25 parts of aniline hydrochloride are dissolved in 400 parts of water. The solution is heated in an autoclave under a pressure of 30 atmospheres of oxygen for 10 hours at 150° C. while stirring. A black powder insoluble in water is obtained which is isolated by filtration. It is suitable as a black pigment dyestuff.

Example 2

20 parts of aminoazobenzene and 10 parts of concentrated hydrochloric acid are added to 400 parts of water. The mixture is treated as described in Example 1 whereby a deep black water-insoluble powder is obtained.

Example 3

20 parts of para-nitraniline and the equivalent amount of concentrated hydrochloric acid are treated under the conditions as described in Example 1. The reaction product is a black powder which is insoluble in water and alcohol, which dissolves in concentrated sulphuric acid with yellow brown color and which is suitable as a pigment dyestuff.

Example 4

20 parts of metanilic acid are heated with 400 parts of water in an autoclave under a pressure of 30 atmospheres of oxygen for 16 hours at 150° C. while stirring. A dark brown powder soluble in water and alcohol is obtained by evaporating the liquid.

Example 5

20 parts of para-phenylene-diamine sulphonic acid are heated together with 400 parts of water in an autoclave under a pressure of 30 atmospheres of oxygen for 14 hours at 150° C. while stirring. A black powder soluble in dilute hydrochloric acid and dyeing wool brown shades is obtained.

Example 6

20 parts of benzidine-ortho-disulphonic acid are heated with 400 parts of water under a pressure of about 30 atmospheres of oxygen for 12 hours at 150° C. The reaction product is a black brown powder soluble in water.

Example 7

25 parts of alpha-naphthylamine hydrochloride are heated with 400 parts of water under a pressure of 30 atmospheres of oxygen for 18 hours at 150° C. By filtration a chocolate brown powder insoluble in water and soluble in concentrated sulphuric acid with brown black color is obtained.

Example 8

By heating 25 parts of beta-naphthylamine hydrochloride with 400 parts of water under a pressure of 30 atmospheres of oxygen for 9 hours at 155° C. while stirring, a black powder insoluble in water is obtained. A similar product, dissolving in concentrated sulphuric acid with a dark brown red color is obtained by employing 1.8-naphthylenediamine hydrochloride instead of beta-naphthylamine hydrochloride while maintaining otherwise similar conditions as described.

Example 9

23 parts of the sodium salt of 2.6.8-naphthylamine disulphonic acid are heated with 400 parts of water under a pressure of 30 atmospheres of oxygen for 17 hours at 150° C. while stirring. By evaporating the liquid a brown black powder soluble in water and dyeing wool brown yellow shades is obtained.

Example 10

26 parts of dimethylaniline hydrochloride is dissolved in 400 parts of water and the solution is heated under a pressure of 30 atmospheres of oxygen for 8 hours at 200° C. while stirring. The reaction product may be employed as a pigment dyestuff. It is a black powder, not soluble in water, dilute caustic soda solution and dilute hydrochloric acid, not vattable and only difficulty soluble in concentrated sulphuric acid.

Example 11

26 parts of 1.4-diaminoanthraquinone hydrochloride are heated with 400 parts of water under a pressure of 30 atmospheres of oxygen for 16 hours at 155° C. while stirring. The reaction product is a black violet powder, dissolving in concentrated sulphuric acid with brown yellow color, but insoluble in water; the product gives a brown vat and dyes cotton pale brown shades.

If instead of 1.4-diaminoanthraquinone hydrochloride the hydrochloride of 1.8-diaminoanthraquinone is employed and the reaction is effected at a temperature of 220° C. while the other conditions are the same as described, the reaction product is a black-brown powder, insoluble in water, dissolving in concentrated sulphuric acid with brown color, giving a brown vat and dyeing cotton brown shades.

Example 12

26 parts of 1.5-diaminoanthraquinone hydrochloride are heated with 400 parts of water in the presence of 1 per cent of vanadic acid under a pressure of 30 atmospheres of oxygen for 15 hours to 150° C. A black powder, soluble in concentrated sulphuric acid with brown black color, insoluble in water, but giving a brown vat and dyeing cotton brown shades is obtained.

If the hydrochloride of 1.4.5.8-tetraminoanthraquinone is employed as initial material, 1 per cent of a mixture of equal parts of the naphthenates of lead, cobalt and manganese is employed as oxygen-transferring agent, the reaction being carried out at 240° C. for 14 hours, a violet black powder is obtained dissolving with red brown color in concentrated sulphuric acid, insoluble in water, giving a brown vat and dyeing cotton gray shades.

Example 13

20 parts of 2-aminoanthraquinone-3-sulphonic acid are heated with 400 parts of water under a pressure of 30 atmospheres of oxygen for 16 hours at 150° C. A black powder dissolving in caustic soda solution with deep red color and giving a brown vat is obtained.

What we claim is:

1. A process of producing a coloring matter containing nitrogen, which comprises treating an aromatic compound containing at least one amino group fixed directly to the aromatic nucleus in a liquid aqueous medium with a gas comprising oxygen under increased pressure and at an elevated temperature.

2. A process of producing a coloring matter containing nitrogen, which comprises treating an aromatic compound containing at least one amino group fixed directly to the aromatic nucleus in a liquid aqueous medium with a gas comprising oxygen under increased pressure at an elevated temperature and in the presence of an oxygen-transferring compound.

3. A process of producing a coloring matter containing nitrogen, which comprises treating an aromatic compound containing at least one amino group fixed directly to the aromatic nucleus in a liquid aqueous medium with oxygen under increased pressure and at an elevated temperature.

4. A process of producing a coloring matter containing nitrogen, which comprises treating an aromatic compound containing at least one amino group fixed directly to the aromatic nucleus in a liquid aqueous medium with oxygen under increased pressure at an elevated temperature and in the presence of an oxygen-transferring compound.

5. A process of producing a coloring matter containing nitrogen, which comprises treating an aromatic compound containing at least one amino group fixed directly to the aromatic nucleus in a liquid acid aqueous medium with a gas comprising oxygen under increased pressure and at an elevated temperature.

6. A process of producing a coloring matter containing nitrogen, which comprises treating an aromatic compound containing at least one amino group fixed directly to the aromatic nucleus in a liquid acid aqueous medium with a gas comprising oxygen under increased pressure at an elevated temperature and in the presence of an oxygen-transferring compound.

7. A process of producing a coloring matter containing nitrogen, which comprises treating an aromatic compound containing at least one amino group fixed directly to the aromatic nucleus in a liquid aqueous medium with a gas comprising oxygen under a pressure above 2 atmospheres and at a temperature between 100° and 250° C.

8. A process of producing a coloring matter containing nitrogen, which comprises treating an aromatic compound containing at least one amino group fixed directly to the aromatic nucleus in a liquid aqueous medium with a gas comprising oxygen in the presence of an oxygen-transferring compound under a pressure above 2 atmospheres and at a temperature between 100° and 250° C.

9. A process of producing a coloring matter containing nitrogen, which comprises treating an aromatic compound containing at least one amino group fixed directly to the aromatic nucleus in a liquid acid aqueous medium with a gas comprising oxygen in the presence of an oxygen-transferring compound under a pressure above 2 atmospheres and at a temperature between 100° and 250° C.

10. A process of producing a coloring matter containing nitrogen, which comprises treating aniline in a liquid aqueous medium with a gas comprising oxygen under increased pressure and at an elevated temperature.

11. A process of producing a coloring matter containing nitrogen, which comprises treating a polynuclear aromatic compound containing at least one amino group, fixed directly to the aromatic nucleus in a liquid aqueous medium with a gas comprising oxygen under increased pressure and at an elevated temperature.

12. A process of producing a coloring matter containing nitrogen, which comprises treating 1.4.5.8-tetraminoanthraquinone in a liquid aqueous medium with a gas comprising oxygen under increased pressure and at an elevated temperature.

13. A process of producing a coloring matter containing nitrogen, which comprises treating β-naphthylamine in a liquid aqueous medium with a gas comprising oxygen under increased pressure and at an elevated temperature.

14. A process of producing a coloring matter containing nitrogen, which comprises treating aniline hydrochloride with water under a pressure of 30 atmospheres of oxygen for 10 hours at 150° C.

15. A process of producing a coloring matter containing nitrogen, which comprises treating 1.4.5.8 - tetraminoanthraquinone hydrochloride with water in the presence of about 1 per cent of equal parts of the naphthenates of lead, cobalt and manganese under a pressure of 30 atmospheres of oxygen for 14 hours at 240° C.

16. A process of producing a coloring matter containing nitrogen, which comprises treating β-naphthylamine hydrochloride with water under a pressure of 30 atmospheres of oxygen for 9 hours at 155° C.

17. Gray to brown to black coloring matters containing nitrogen which are obtainable by treating a polynuclear aromatic compound containing at least one amino group fixed directly to the aromatic nucleus in a liquid aqueous medium with a gas comprising oxygen under increased pressure and at elevated temperature.

18. Gray to brown to black coloring matters containing nitrogen which are obtainable by treating an aminoanthraquinone in a liquid aqueous medium with a gas comprising oxygen under increased pressure and at elevated temperature.

19. Gray to brown to black coloring matters containing nitrogen which are obtainable by treating a polyaminoanthraquinone in a liquid aqueous medium with a gas comprising oxygen under increased pressure and at elevated temperature.

20. The violet black coloring matter containing nitrogen which is obtainable by treating 1.4.5.8-tetraminoanthraquinone in a liquid aqueous medium with a gas comprising oxygen under increased pressure and at elevated temperature.

HEINRICH HOPFF.
ROBERT SCHWEIZER.